(12) United States Patent
Enomoto et al.

(10) Patent No.: US 8,396,294 B2
(45) Date of Patent: Mar. 12, 2013

(54) IMAGE PROCESSING DEVICE, IMAGE PROCESSING METHOD, AND PROGRAM AND RECORDING MEDIUM THEREOF

(75) Inventors: Makoto Enomoto, Kawasaki (JP); Tomotoshi Kanatsu, Tokyo (JP); Keiko Nakanishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1012 days.

(21) Appl. No.: 12/331,330

(22) Filed: Dec. 9, 2008

(65) Prior Publication Data

US 2009/0154810 A1 Jun. 18, 2009

(30) Foreign Application Priority Data

Dec. 12, 2007 (JP) .................. 2007-321283

(51) Int. Cl.
*G06K 9/00* (2006.01)
(52) U.S. Cl. ....................................................... 382/181
(58) Field of Classification Search .................. None
See application file for complete search history.

(56) References Cited

U.S. PATENT DOCUMENTS

| | | | | |
|---|---|---|---|---|
| 5,689,620 A * | 11/1997 | Kopec et al. | ................ | 706/12 |
| 5,933,249 A | 8/1999 | Shimura et al. | | |
| 6,628,832 B2 | 9/2003 | Kanatsu | | |
| 6,970,601 B1 | 11/2005 | Kaneda et al. | | |
| 7,133,565 B2 * | 11/2006 | Toda et al. | ................ | 382/243 |
| 7,310,769 B1 * | 12/2007 | Dash | ................ | 715/269 |
| 7,668,814 B2 * | 2/2010 | Il | ................ | 707/999.003 |
| 7,706,611 B2 * | 4/2010 | King et al. | ................ | 382/181 |

| | | | |
|---|---|---|---|
| 2003/0123727 A1 | 7/2003 | Kanatsu | |
| 2005/0238257 A1 | 10/2005 | Kaneda et al. | |
| 2008/0137109 A1 * | 6/2008 | Lapstun et al. | ........... 358/1.9 |

FOREIGN PATENT DOCUMENTS

| | | | |
|---|---|---|---|
| JP | 7-236062 | | 9/1995 |
| JP | 2003-322417 | | 11/2000 |
| JP | 2002-77633 | | 3/2002 |
| JP | 2005-275863 A | * | 3/2004 |
| JP | 2005-259017 A | | 9/2005 |
| JP | 2005-275863 A | | 10/2005 |

OTHER PUBLICATIONS

Chinese Office Action dated Oct. 12, 2010 in Chinese Patent Application No. 200810183281.3.
Japanese Office Action dated Oct. 23, 2012 in Japanese Application No. 2007-321283.

* cited by examiner

*Primary Examiner* — Chan S Park
*Assistant Examiner* — Ha Le
(74) *Attorney, Agent, or Firm* — Fitzpatrick, Cella, Harper & Scinto

(57) ABSTRACT

In an electronic document of drawing descriptions of a page image and a character, it is desired that although a font data necessary for drawing the character is held in the electronic document, the size of the electronic document is minimized. Furthermore, it is desired to ensure visibility at the time of highlighting of search. There is generated an electronic document in which a document image, a plurality of character codes obtained by executing a character recognition processing with respect to the document image, and a plurality of kinds of glyph data to be utilized in common with respect to the plurality of character codes when drawing characters corresponding to the plurality of character codes are stored. The plurality of kinds of glyph data are selectively used when characters corresponding to the character codes are drawn. It is desirable that the glyph data be the one in a simple form.

14 Claims, 20 Drawing Sheets

```
<?xml version="1.0"?>
<Document>

<Page Width="1680" Height="2376" Dpi="200" Number="1">

<Image X="0" Y="0" Width="1680" Height="2376"
         Data="ACAf49sw89q34rs6dbc23cfasx....a3E52zAD"/>

<Text X="236" Y="272" Size="97" Direction="Horizontal"
        Color="0,0,0,255" String="0x2422,0x2424,0x2426"
        CWidth="104,96,59", CGlyphId="0,0,0"/>

<Text X="236" Y="472" Size="92" Direction="Horizontal"
        Color="0,0,0,255" String="0x242b,0x242d,0x242f"
        CWidth="113,101,47", CGlyphId="0,0,0"/>

</Page>

<Page Width="1680" Height="2376" Dpi="200" Number="2">

<Image X="0" Y="0" Width="1680" Height="2376"
         Data="sa8OAN2qx7sa23Basd2x....aAqw8D2dDJ"/>

<Text X="136" Y="872" Size="92" Direction="Horizontal"
        Color="0,0,0,255" String="0x242b,0x242d,0x242f"
        CWidth="113,101,47", CGlyphId="0,0,0"/>

</Page>

<Font Id="Font01">
  <Glyph Id="0" Path="M0,0 V-1024 H1024 V1024 f"/>
 </Font>
 <Font Id="Font02">
  <Glyph Id="0" Path="M0,0 V-64 H1024 V64 f"/>
 </Font>
</Document>
```

601 — `<?xml version="1.0"?>` / `<Document>`
602 — `<Page ... Number="1">`
603 — `<Image ...>`
604 — `<Text ... Y="272" ...>`
605 — `<Text ... Y="472" ...>`
606 — `</Page>`
607 — `<Page ... Number="2">`
608 — `<Image ...>`
609 — `<Text ... Y="872" ...>`
610 — `</Page>`
611 — `<Font Id="Font01">`
612 — `<Font Id="Font02">`
613 — `</Document>`

FIG.6

| REGION | x | y | WIDTH | HEIGHT | REGION TYPE |
|---|---|---|---|---|---|
| 1 | 236 | 272 | 260 | 292 | TEXT |
| 2 | 634 | 1264 | 898 | 830 | PHOTOGRAPH |

| CHARACTER | x | y | WIDTH | HEIGHT | CODE |
|---|---|---|---|---|---|
| 1 | 236 | 272 | 80 | 97 | 0x2422 |
| 2 | 339 | 248 | 79 | 75 | 0x2424 |
| 3 | 434 | 274 | 59 | 95 | 0x2426 |

| CHARACTER | x | y | WIDTH | HEIGHT | CODE |
|---|---|---|---|---|---|
| 1 | 236 | 474 | 87 | 85 | 0x242b |
| 2 | 348 | 472 | 75 | 92 | 0x242d |
| 3 | 448 | 472 | 47 | 89 | 0x242f |

FIG.11B

| CHARACTER | CODE | CODE |
|---|---|---|
| 0 | 0x2422 | 1093 |
| 1 | 0x2424 | 1100 |
| 2 | 0x2426 | 1107 |
| 3 | 0x242b | 1250 |
| 4 | 0x242d | 1257 |
| 5 | 0x242f | 1264 |
| 6 | 0x242b | 1601 |
| 7 | 0x242d | 1608 |
| 8 | 0x242f | 1615 |

FIG.12

```xml
<?xml version="1.0"?>
<Document>
```
1501

```xml
 <Page Width="1680" Height="2376" Dpi="200" Number="1">
```
1502

```xml
  <Image X="0" Y="0" Width="1680" Height="2376"
         Data="ACAf49sw89q34rs6dbc23cfasx....a3E52zAD"/>
```
1503

```xml
  <Text X="236" Y="272" Size="97" Direction="Horizontal"
        Color="0,0,0,255" String="0x2422,0x2424,0x2426"
        CWidth="104,96,59", CGlyphId="0,0,0"/>
```
1504

```xml
  <Text X="236" Y="472" Size="92" Direction="Horizontal"
        Color="0,0,0,255" String="0x242b,0x242d,0x242f"
        CWidth="113,101,47", CGlyphId="0,0,0"/>
```
1505

```xml
 </Page>
```
1506

```xml
 <Page Width="1680" Height="2376" Dpi="200" Number="2">
```
1507

```xml
  <Image X="0" Y="0" Width="1680" Height="2376"
         Data="sa8OAN2qx7sa23Basd2x....aAqw8D2dDJ"/>
```
1508

```xml
  <Text X="136" Y="872" Size="92" Direction="Horizontal"
        Color="0,0,0,255" String="0x242b,0x242d,0x242f"
        CWidth="113,101,47", CGlyphId="0,0,0"/>
```
1509

```xml
 </Page>
```
1510

```xml
 <Font Id="Font01" Shape="BOX">
  <Glyph Id="0" Path="M0,0 V-1024 H1024 V1024 f"/>
 </Font>
```
1511

```xml
 <Font Id="Font02" Shape="UNDER_LINE">
  <Glyph Id="0" Path="M0,0 V-64 H1024 V64 f"/>
 </Font>
```
1512

```xml
</Document>
```
1513

FIG.15

A B C
 G
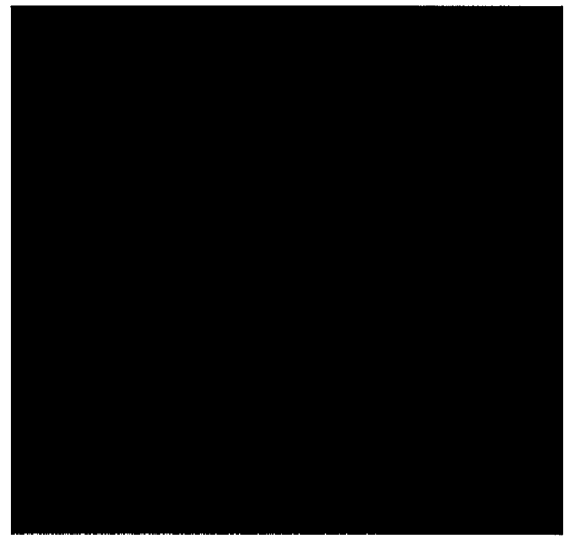
FIG.19

IMAGE PROCESSING DEVICE, IMAGE PROCESSING METHOD, AND PROGRAM AND RECORDING MEDIUM THEREOF

BACKGROUND OF THE INVENTION

1. Field of the Invention

The present invention relates to a technique of converting a paper document to data that can be electronically searched.

2. Description of the Related Art

Recently, a scanner or a mass storage device such as a hard disk permits easy operations of computerizing a document having been heretofore stored as a paper document, and storing it as an electronic document. In particular, not only a paper document is scanned to be converted to an image data, but also it is generally carried out that character information written therein is read by a character recognition technique to be stored as additional information of an image. As to an electronic document having been stored in such way, by a character string that is included in an original document being input as a search keyword by a user, a desired document can be retrieved at high speed from large amounts of a stored document group.

Furthermore, proposed is the one in which on the occasion when a user makes a search using a search keyword with respect to an electronic document to which such character information is related, the portion at which this search keyword is described on a document image thereof is highlighted so that the user can identify it (for example, Japanese Patent Laid-Open No. 2000-322417). In such manner, since the character portion corresponding to the search keyword is displayed in the highlighted state, even in the case in which there are present in the document a plurality of description points of the same keyword, by switching a page image, a user can efficiently identify description portions of the keyword.

Whereas, there is also a technique that results of character recognition processing are embedded in an image file as a transparent text (character code of a transparent color being specified as a drawing color), and stored in PDF (Portable Document Format) format. When the PDF file having been created in such way is displayed, the transparent text is drawn on the character image in the document image. Thus, when making a keyword search, the transparent text is searched. However, the user cannot see the transparent text itself, so that it appears as if the image were searched. In this manner, based on a file of format that is described with a page description language capable of drawing an image and a character, an image that can be searched with a search keyword can be drawn.

To draw characters in an electronic document using a page description language such as PDF or SVG, character shape information of each character that is a font data is required. However, since generally the size of a font data is large, for the purpose of making the size of an electronic document small, it is generally carried out that the font data is not stored in the electronic document, and in the electronic document, specification of the kind of font is made. In this way, on the occasion of drawing with an application, drawing can be done using the font that is installed in a personal computer.

On the other hand, there are some cases in which a font data is desired to be stored in an electronic document. For example, in the case in which the electronic document having been created with the use of a document creation application is opened using another personal computer, when the font data that is used in this electronic document is not installed in this personal computer, this electronic document cannot be exactly opened. In other words, even in the case in which the electronic document is reproduced using a personal computer or an application in which a specified font data is not installed, if a font data itself is stored in the electronic document, this electronic document can be reproduced exactly.

Furthermore, depending on the application, in some cases, it is preferably essential conditions that a font data for use in drawing of characters is stored in an electronic document. For example, as to the file intended to be stored long-term, after a long period has elapsed, due to changes in OS, the font that is installed as default may be changed. Thus, it is contemplated that the form of storage of a font data is required to be stored.

In addition, depending on the form of a format, there is also a format in which it is essential conditions to store a font data in an electronic document. For example, in the format of XPS (XML Paper Specification), in the case in which a text data is stored, it is necessary to store a font data together as well.

When, however, a font data is stored in an electronic document, the size itself of the electronic document is increased. In case where the file size is increased, a problem exists in that a longer time on the occasion of transmitting the electronic document through a network is required, or that a large storage capacity on the occasion of storage is required.

In an electronic document of a file format of drawing with the use of a font data that is stored in the electronic document in such way, it is desired to prevent the increase of a file size. In particular, in the case in which a scan image, a text data of results of character recognition processing and a font data for text drawing are stored together in the electronic document, it is desired to prevent the increase of a file size. When a font data has to be stored in the electronic document due to restrictions of a format or restrictions of a system, the increase of a file size is likely to be problematic.

Furthermore, on the occasion of highlighting of search results, depending on characteristics of a viewer of displaying a document, there are different ways of highlighting of search results. That is, depending on the performance of highlighting of search results, a character image on the image may be hard to see.

In such situations, in processing of converting a paper document to an electronically searchable electronic document, the following functions are required. That is, it is desired to ensure visibility at the time of highlighting of search while minimizing the size of an electronic document even if a font data to be used is held in this electronic document.

SUMMARY OF THE INVENTION

An object of the present invention is to ensure visibility at the time of highlighting of search while minimizing the size of an electronic document even if a font data to be used is held in this electronic document.

In the first aspect of the present invention, there is provided an image processing device comprising: a character recognition unit configured to obtain a character code corresponding to each character image by executing a character recognition processing with respect to a plurality of character images in a document image; and a generation unit configured to generate an electronic document in which the document image, the plurality of character codes obtained by the character recognition unit, and a plurality of kinds of glyph data are stored, wherein one of the plurality of kinds of glyph data is selected and the selected glyph data is utilized in common with respect to the plurality of character codes when drawing characters corresponding to the plurality of character codes.

In the second aspect of the present invention, there is provided an image processing device comprising: a search unit configured to search with an input keyword an electronic document in which a document image, a plurality of character codes obtained by executing a character recognition processing with respect to the document image, and a plurality of kinds of glyph data for being utilized in common with respect to the plurality of character codes when drawing characters corresponding to the plurality of character codes are stored; a switching unit configured to receive a switching instruction of glyph data from a user as to the plurality of kinds of glyph data; and an electronic document display unit configured to highlight a portion coincident with the keyword as a result of search by the search unit using the glyph data switched by the switching unit.

In the third aspect of the present invention, there is provided an image processing device comprising: a search unit configured to search with an input keyword an electronic document in which a document image, a plurality of character codes obtained by executing a character recognition processing with respect to the document image, a plurality of kinds of glyph data for being utilized in common with respect to a plurality of character codes when drawing characters corresponding to the plurality of character codes, and attribute data used as a criteria for determining when selecting glyph data used in drawing are stored; and an electronic document display unit configured to highlight a portion coincident with the keyword as a result of search by the search unit using the glyph data selected from among the plurality of kinds of glyph data based on the attribute data used as the criteria for determining.

In the fourth aspect of the present invention, there is provided an image processing method comprising: obtaining a character code corresponding to each character image by executing a character recognition processing with respect to a plurality of character images in a document image; and generating an electronic document in which the document image, the plurality of character codes obtained by the character recognition processing, and a plurality of kinds of glyph data are stored, wherein one of the plurality of kinds of glyph data is selected and the selected glyph data is utilized in common with respect to the plurality of character codes when drawing characters corresponding to the plurality of character codes.

In the fifth aspect of the present invention, there is provided a computer-readable recording medium having computer-executable instructions for performing an image processing method, the image processing method comprising the steps of: obtaining a character code corresponding to each character image by executing a character recognition processing with respect to a plurality of character images in a document image; and generating an electronic document in which the document image, the plurality of character codes obtained by the character recognition processing, and a plurality of kinds of glyph data are stored, wherein one of the plurality of kinds of glyph data is selected and the selected glyph data is utilized in common with respect to the plurality of character codes when drawing characters corresponding to the plurality of character codes.

According to the present invention, a paper document is converted to an electronic document including drawing descriptions of a scanned page image and descriptions of drawing (with a transparent color) characters having been extracted from the page image. On this occasion, in an internal part of this electronic document, a plurality of glyph data that is formed of simple character shapes is stored. Furthermore, in each glyph data, one character shape is made to be used in common with respect to a plurality of character kinds (a plurality of different character codes). Whereby, although a font data to be used is held in the electronic document, a less glyph data (character shape data) is required, so that the file size (data capacity) of this electronic document can be minimized. In addition, some font data are stored, and switching among a plurality of character shapes and drawing can be made. Consequently, even in the case of highlighting of search using different applications, display of high visibility or operability can be achieved.

Further features of the present invention will become apparent from the following description of exemplary embodiments (with reference to the attached drawings).

BRIEF DESCRIPTION OF THE DRAWINGS

FIG. 6 is one example of an electronic document to be generated according to the embodiment 1 of the present invention;

FIG. 9 is one example of a region data to be generated in the embodiments 1 and 2 of the present invention;

FIG. 11A and FIG. 11B are an example of a character code string data to be generated in the embodiment 1 and 2 of the present invention;

FIG. 12 is one example of a character code string table to be utilized in the embodiments 1 and 2 of the present invention;

FIG. 15 is one example of an electronic document to be generated according to the embodiment 2 of the present invention;

FIG. 19 is an example of a page display in which a search result is highlighted.

DESCRIPTION OF THE EMBODIMENTS

Figure 1:
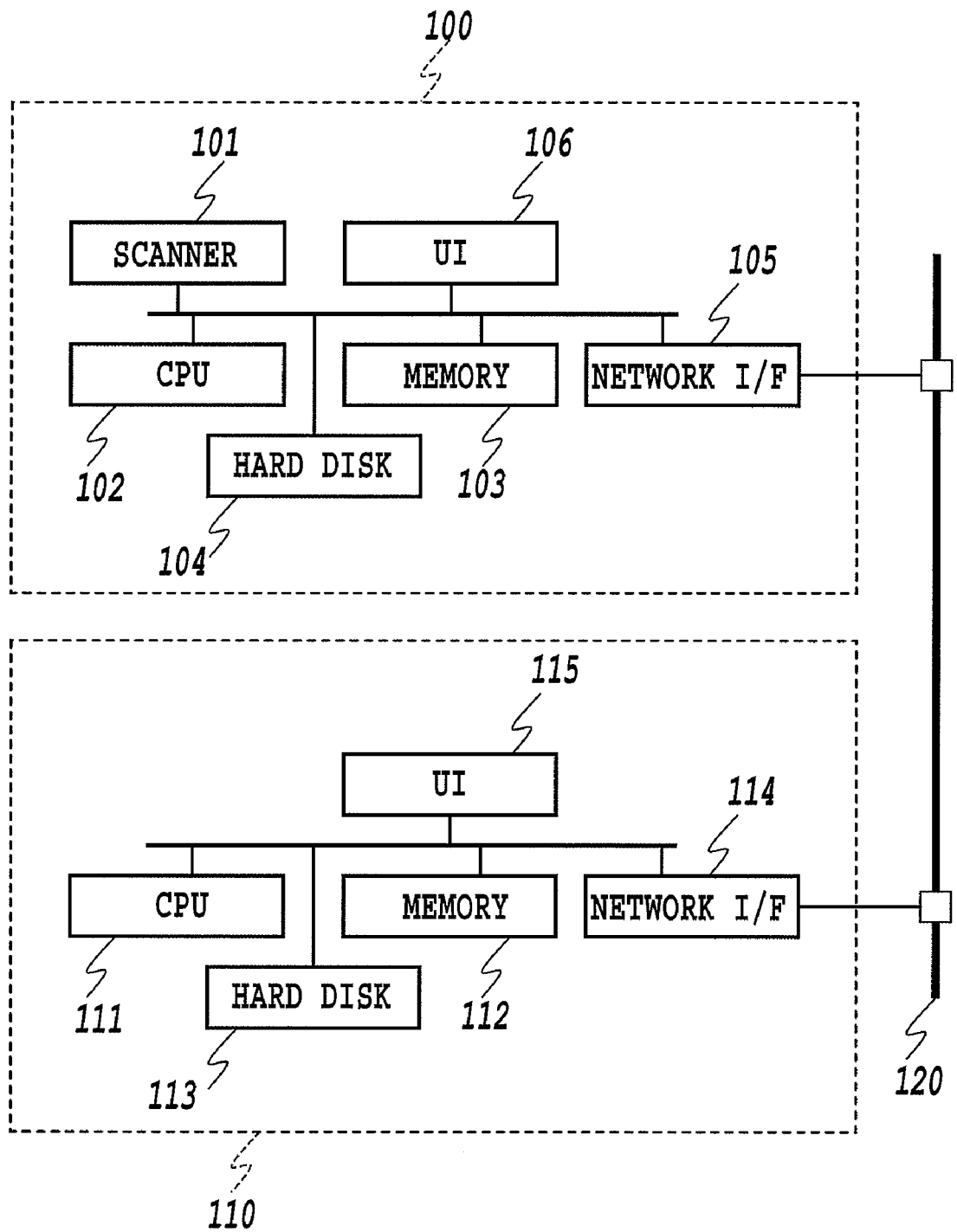
FIG. 1 is a block diagram illustrating an arrangement example of an image processing device according to embodiments 1 and 2 of the present invention.

Hereinafter, preferred embodiments according to the present invention will be described referring to the drawings.

However, it should be appreciated that components described in these embodiments are for demonstrative purposes, the scope of this invention is not limited to these components.

Embodiment 1

Hereinafter, an exemplary embodiment according to the present invention will be described referring to the drawings.

FIG. 1 is one example of a block diagram illustrating arrangement of an image processing device that can carry out the present invention.

Reference numeral 100 designates an image processing device of converting a paper document to an electronic document, which is formed of each of the following devices.

Reference numeral 101 designates a scanner converting page space information of a paper document having been read to data of an image. Numeral 102 designates a CPU executing e.g., a program of analyzing an image data and converting it to a searchable electronic document. A memory 103 and a hard disk 104 are a storage device for storing results of conversion to the electronic document or data in progress by operation of the above-mentioned program.

Numeral 105 designates a network I/F outputting data having been generated according to the above-mentioned program outside the device. Numeral 106 designates an interface for receiving instructions from a user, which interface is formed of an input device such as input keys or a touch panel, and a display device such as a liquid crystal.

Numeral 110 designates an image processing device of searching and browsing of the electronic document having been created at the image processing device 100, which image processing device is formed of the following devices.

A CPU 111 executes a program of interpreting data of the electronic document and creating a display data for searching or browsing, or a program of controlling a search operation. A memory 112 and a hard disk 113 is a storage device for storing an electronic document data, or storing a display data that is created by operation of the above-mentioned program or data in processing. Numeral 114 designates a network I/F for transferring the electronic document having been created outside the device into the device. Numeral 115 designates an interface for receiving instructions from a user, which interface is formed of an input device such as input keys or a touch panel, and a display device such as a liquid crystal.

Numeral 120 designates a network providing an electronic connection between the image processing device 100 and the image processing device 110.

Now, an example of processing according to the embodiment 1 will be described using flowcharts of FIGS. 2 and 3.

Figure 2:
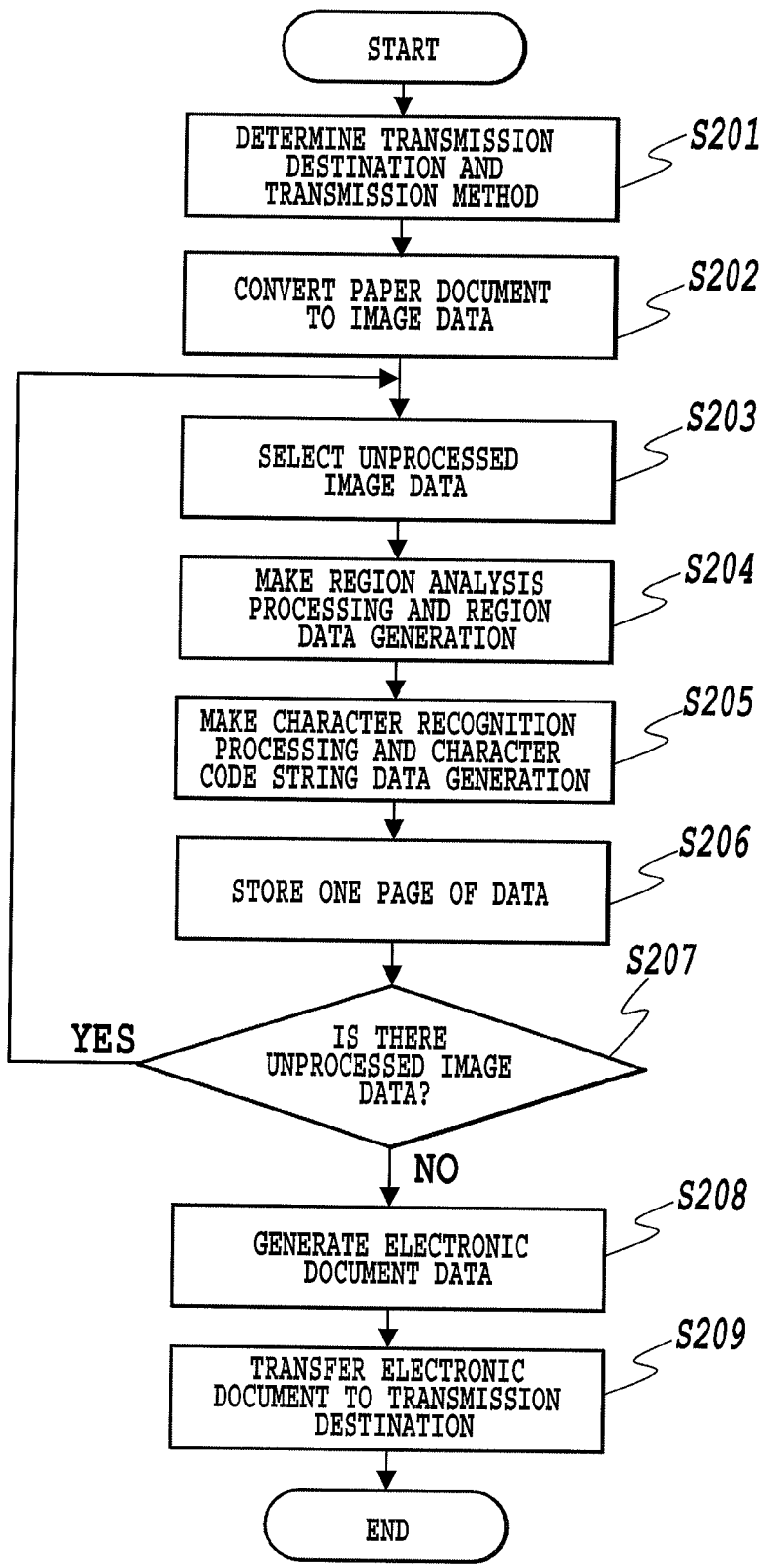
FIG. 2 is a flowchart showing an example of electronic document generation processing according to the embodiments 1 and 2 of the present invention.

FIG. 2 is a flowchart showing an example of processing of creating a searchable electronic document from an image data having been obtained by e.g., scanning a paper document at the image processing device 100, and transmitting this electronic document to the image processing device 110.

First, in Step S201, in accordance with an instruction operation from a user, a transmission destination and a transmission method of an electronic document to be created is determined. The instruction from the user is done via the user interface 106. Furthermore, the transmission method is selected from among alternatives such as an electronic mail or file transfer using FTP.

When a user sets a paper document and depresses a start key, in Step S202, the scanner 101 scans the paper document with the use of a known photoelectric conversion technique to convert it to a page image data (document image). In the case in which plural pages of document is input manually or using an auto-document feeder, the paper document having been scanned is converted to one page image data per page, and stored in the memory 103 in an input order.

Figure 7:
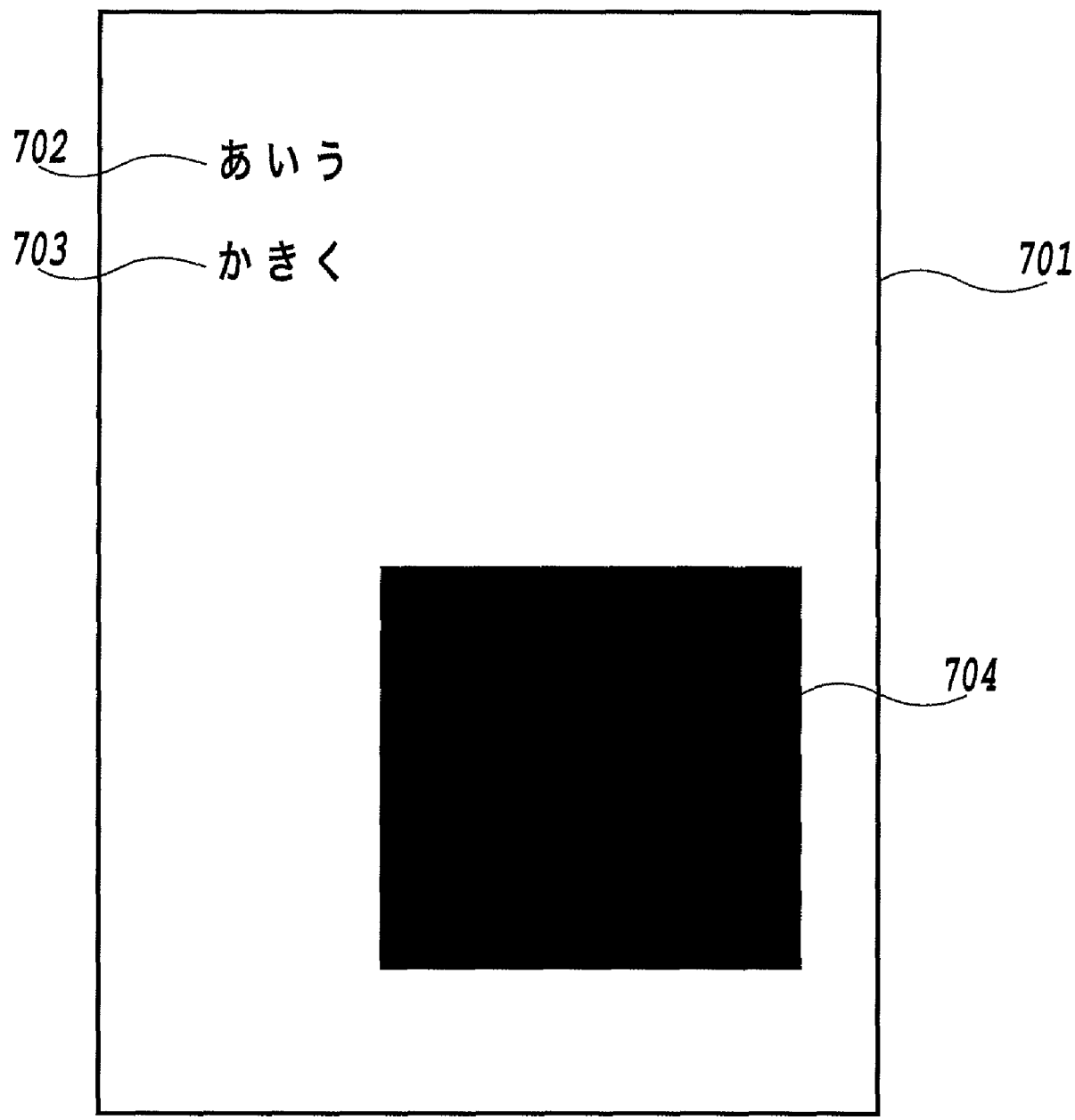
FIG. 7 is one example of a page image to be processed in the embodiments 1 and 2 of the present invention.
Figure 18:
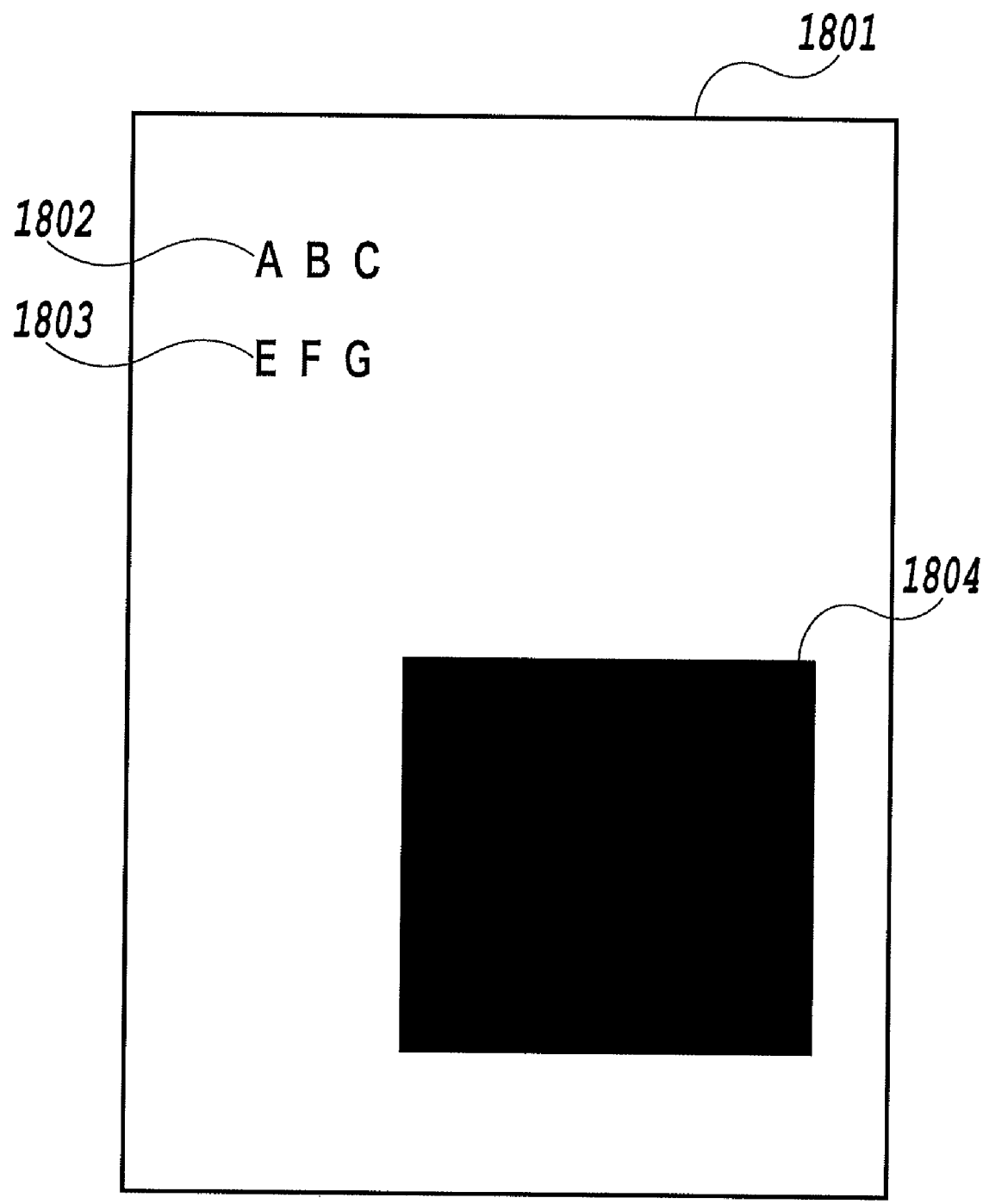
FIG. 18 is an example of a page image to be processed.

FIG. 7 illustrates an example of a page image. In a page image 701 of FIG. 7, there are present a character image that consists of a character string 702 of "A, I, U (each Japanese character)" and a character string 703 of "KA, KI, KU (each Japanese character)", and a photograph 704. Incidentally, for purposes of illustration, although the photograph 704 is simply shown to be a black rectangle, it is actually a natural image. In addition, in the example of FIG. 7, although only an example of the character strings 702 and 703, and the photograph 704 is shown, there may be other regions of graphics and the like. In FIG. 7, an example of a document image is shown, in which hiragana characters (Japanese characters) are described as the character strings 702, 703, however, in the present embodiment, characters are not limited to hiragana characters but other character kinds, such as alphabets and kanji characters (Chinese characters), may be used. FIG. 18 is an example of a document image 1801 including alphabet character strings 1802, 1803 and a photograph 1804. That is, if a character recognition processing suitable to each language is executed, it is possible to similarly execute processing to be described later, with respect to documents described in other languages, not limited to Japanese documents.

As to the form of a page image data, for example, when a paper document is colored, it is a color image explaining gradation thereof with 8 bits of each of RGB; and when a paper document is black and white, it is to be a gray scale image explaining a luminance with 8 bits or a binary image explaining black and white with 1 bit.

In Step S203, an unprocessed page image data that is stored in the memory 103 is selected as a processing object image. Incidentally, in the case in which there are plural pages of images, one page of image is selected as a processing object in an input order.

In Step S204, from an image having been selected, region analysis processing of making region identification with respect to respective regions having different characteristics such as a text region, a graphic region, a photograph region and a table region is done, and a region data regarding each region having been identified is generated to be stored in the memory 103. Incidentally, in this region data, included are coordinate values x and y in x and y directions of pixels in an image with respect to the upper left position of a bounding rectangle of the corresponding region, values of the number of pixels width and height representing the size (width and height) of this bounding rectangle, and further region types such as a text and a photograph.

In the above-mentioned region analysis processing, a known technique (it is also referred to as region identification processing, region determination processing and region extraction processing) is employed. For example, in case of employing a technique disclosed in Japanese Patent Laid-Open No. 06-68301 (1994), from a binary document image data, the range where black pixel masses of a similar size are strung lengthways or sideways can be extracted as a text region.

Figure 8:
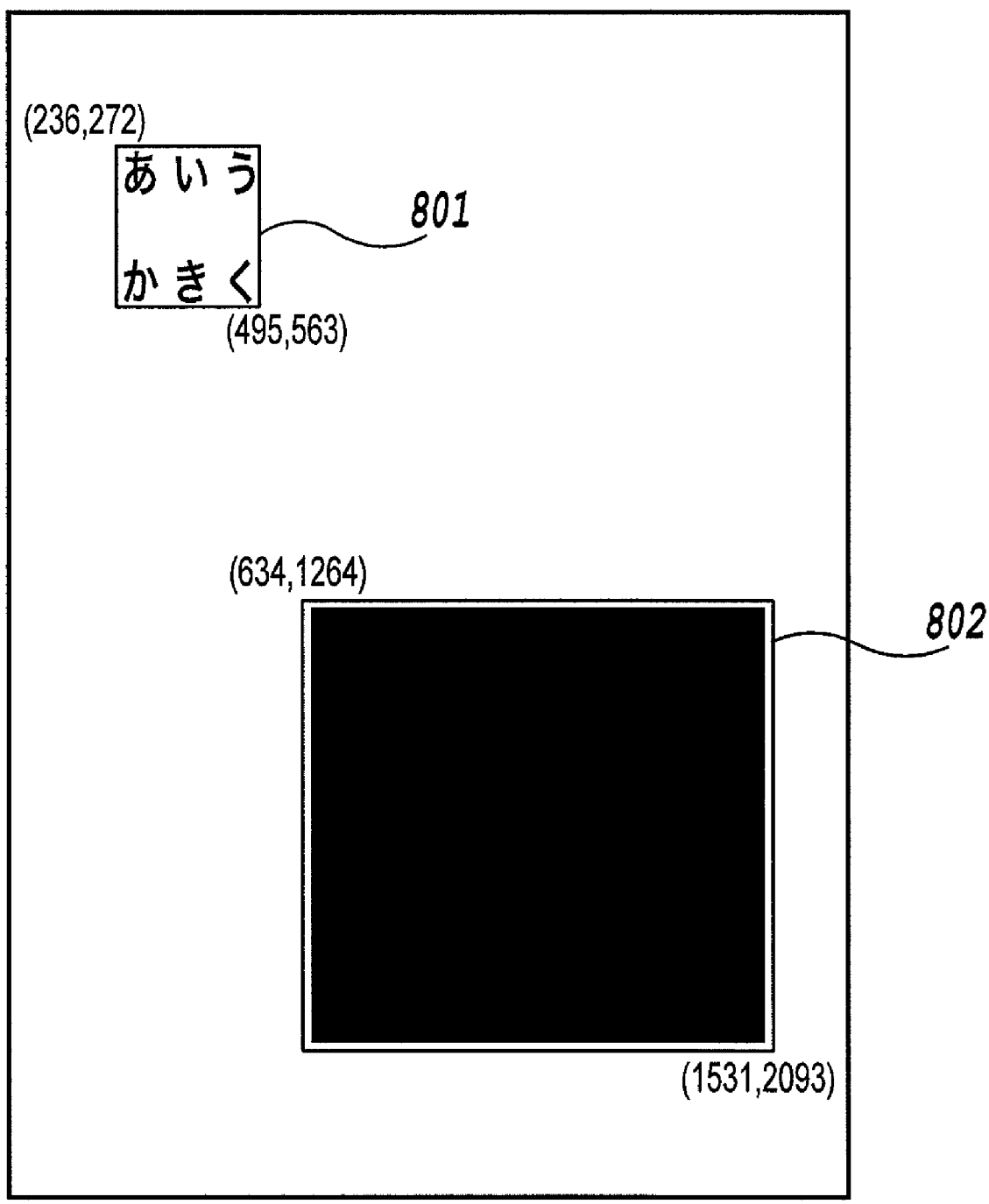
FIG. 8 is a view illustrating an example of region analysis processing to be executed in the embodiments 1 and 2 of the present invention.

Here, in FIGS. 8 and 9, a region analysis processing example with respect to a page image 701 illustrated in FIG. 7 is shown. Reference numeral 801 in FIG. 8 designates a region determined to be a text region, and numeral 802 designates a region determined to be a photograph region. FIG. 9 is an example of a region data that is obtained by this region analysis processing. Also when the region analysis processing is executed with respect to a page image including alphabet character strings (for example, the image 1801 in FIG. 18), a region analysis result similar to that in FIG. 7 will be obtained.

Next, in Step S205, by making character recognition processing with respect to a character image in each text region having been identified by region analysis processing, data of a character code string of each text region is obtained to be stored in the memory 103. Here, in data of the character code string, included are character code information, being recognition results with respect to each character image in the region, and bounding rectangle information of this each character image (coordinates x and y at the upper left of the bounding rectangle and information of the width and height thereof width and height).

Here, an example of the above-mentioned character recognition processing will be briefly described. Incidentally, processing of character recognition of a character image can employ a known technique.

First, in the case in which a document image is not a binary image, an internal part of the text region is made to be binary to obtain the binary image in the text region. As to this internal part of each text region having been made binary, the number of black pixels in each of vertical or horizontal lines is counted to create a histogram. Based on the histogram of length and width, letting the direction of a periodical histogram a line direction, and letting the portion where the number of black pixels of the histogram is not less than a predetermined threshold the portion of forming a character line, strips of a line image is obtained. Subsequently, with respect to each line image, a histogram is obtained in the direction perpendicular to the line direction, and an image of each character is cut out based on results of the histogram. This range having been cut out is to be bounding rectangle information of one character. Incidentally, although here, determination is made using the histogram of counting the number of black pixels, determination of character regions may be made using projection of illustrating whether or not there are black pixels in each line.

Next, from an image in the bounding rectangle of each character image, e.g., an edge component is retrieved to obtain a feature vector, which is compared with a feature vector in a character recognition dictionary having preliminarily been registered, to obtain the degree of similarity. Then, the code of a character kind (kind of a character) of the highest similarity is to be a character code with respect to the character image in this rectangle. In such manner, with respect to bonding rectangles of all the characters present in the text region, data to which character codes are assigned is obtained. Then, a character code set having been obtained from each text region is to be a character code string.

Furthermore, with respect to a character region of English sentences, it is also determined whether or not the space between words is present between characters. For example, determination on whether or not the distance between words is long is made, or determination on whether or not it is a gap between words by matching between a character string of character recognition results of a character image and a word dictionary is made, whereby it can be determined whether or not there is present the space between words. In the case in which the presence of the space between words is determined, a character code of this space is to be inserted in the character code string.

Incidentally, the above-mentioned description is one example, and a character code string may be obtained employing a processing method of utilizing other known techniques.

Figure 10:
FIG. 10 is a view illustrating an example of character recognition processing to be executed in the embodiments 1 and 2 of the present invention.

In FIG. 10, FIGS. 11A and 11B, shown is a character recognition processing example with respect to the text region 801 illustrated in FIG. 8.

From a text region 1000 in FIG. 10, first character lines 1001 and 1002 are cut out, and further three characters 1011, 1012 and 1013 are cut out of an internal part of the character line 1001. Then, each character is recognized, and as a result, a character code corresponding to each character is obtained, to generate a character code string data as illustrated in a table 1101 of FIG. 11A. In the same way, three characters 1021, 1022 and 1023 having been cut out of an internal part of the character line 1002 are subjected to character recognition processing, and thus a character code string data 1102 in FIG. 11B is generated. FIG. 10, FIG. 11A and FIG. 11B show a case where the character recognition processing is executed with respect to a Japanese text region, however, the present invention is not limited to Japanese. For example, it is also possible to obtain character codes by similarly executing the character recognition processing with respect to text regions including other languages (for example, English alphabets). That is, when characters, such as English alphabets, are recognized, character codes of alphabet are input to the character code string data in FIG. 11A and FIG. 11B instead of Japanese character codes.

Subsequently, in Step S206, a page image data, a region data, and a character code string data that are to be processed are associated, and stored in the memory 103 or the hard disk 104.

In Step S207, it is determined whether or not there is an image data not having been processed. When it is present, operation returns to Step S203, and processing of the next page image data is made. When it is absent, the operation goes to Step S208.

In Step S208, all pages of data that are stored in the memory 103 or the hard disk 104 is synthesized in a page order (in the order of being processed) to generate a searchable electronic document that is formed of a plurality of pages.

Data of an electronic document to be generated in the above-mentioned Step S208 is data capable of holding both drawing information for electronically displaying each page image on a display and the like or printing it using a printer, and content information for enabling to search with a search keyword. As a data format that satisfies such data holding conditions, there are various known examples such as PDF format or SVG format. In this embodiment, as a format of an electronic document to be generated at this time, it is assumed to be specified to embed a font data. Incidentally, as a format form having an essential condition of embedding a font data, for example, there is XPS. Although hereinafter, descriptions will be made on the assumption of the specification of a page description format using XML representation, the present invention is not limited to this format. It is a matter of course to use an electronic document format such as existing XPS or PDF/A of the format of embedding a character shape.

FIG. 6, in the case in which a document that is formed of two pages of page images is input, is a page description example of an electronic document generated based on the specification of a page description format for use in descriptions of the present invention. Incidentally, although here, an example of a page description format, as illustrated in FIG. 6, is the one in which all descriptions are made in one file, it is not limited to this example. For example, it is preferable to be a format (for example, XPS) in which the portion of a font data is in another file, the font data file is referred to from the file of a main body, and these files are made together in one electronic document by e.g., ZIP compression.

Figure 4:
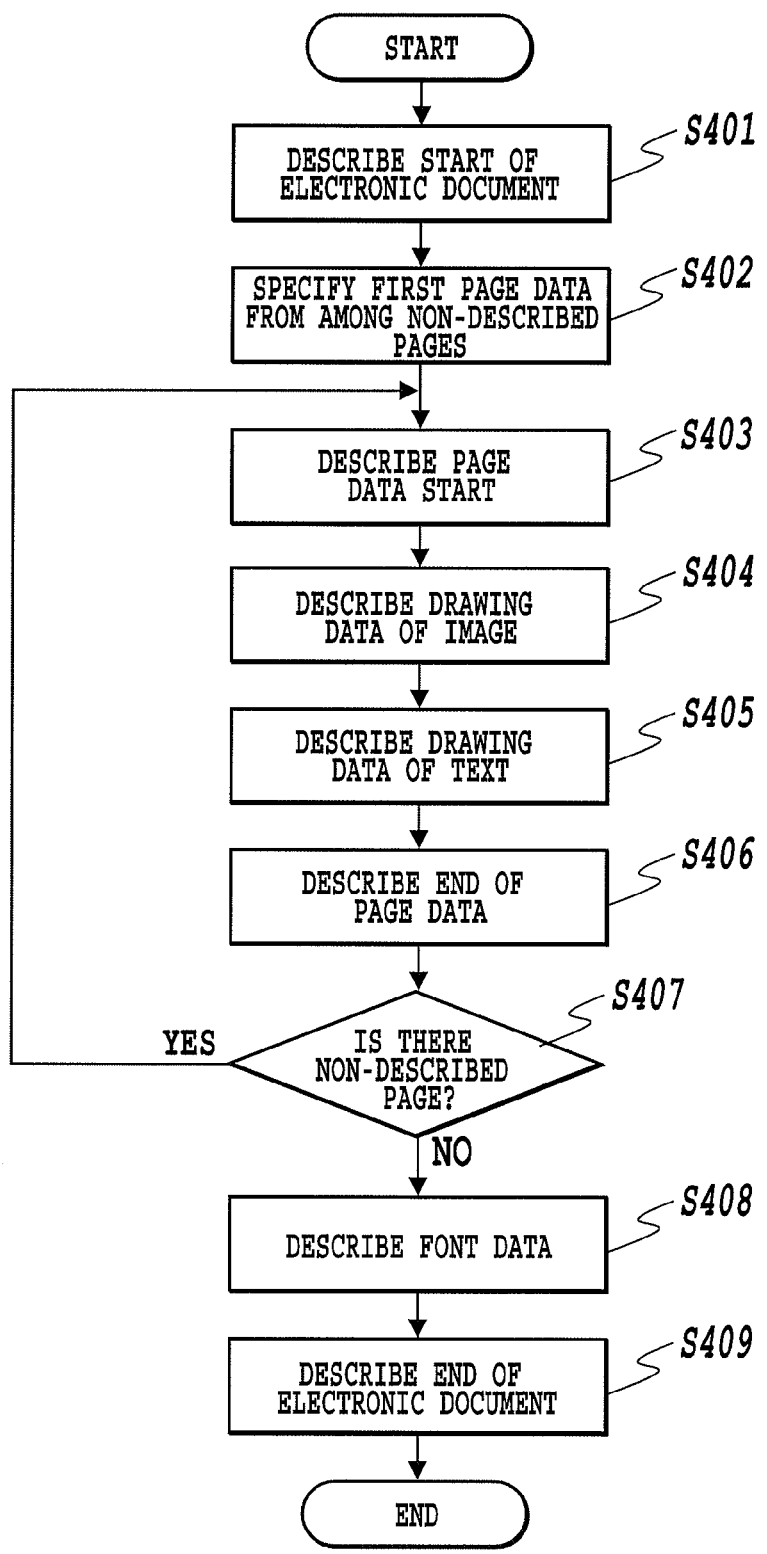
FIG. 4 is a flowchart showing an example of electronic document data generation processing to be executed in Step S208 in FIG. 2.

Hereinafter, an example of an electronic document data generation processing to be done in Step S208 will be described using a flowchart of FIG. 4.

First, description of representing the start of an electronic document is generated in Step S401.

In a page data description format specification according to descriptions of the present invention, an element of <Document> represents a start tag of an electronic document, and XML descriptions in the range sandwiched between this <Document> and </Document>, being the end thereof are description data regarding each page included in this document. In the example of FIG. 6, reference numeral 601 designates a start tag of an electronic document, and numeral 613 designates an end tag.

In Step S402, data of the first page is specified from among pages not having been described, and is to be a processing object.

In Step S403, a tag representing the start of the page data to be processed is generated to be described. In this example, an element tag of <Page> describes the start of the page data, and XML descriptions in the range sandwiched between this <Page> and </Page>, being the end tag thereof are to be a drawing data and a content data in this page. Furthermore, in <Page> tag, the physical size of a page is described using attributes Width and Height indicating the width and height of pixels of this page, and an attribute Dpi indicating a resolution, and further a page number is described using an attribute Number indicating a page number.

In the description example of FIG. 6, in a start tag 602 of <Page> element, a width Width="1680", height Height="2376" and resolution Dpi="200", and page number Number="1" of this page are described. In addition, data of this one page is described from the tag 603 to the end tag 606 (603 to 606).

In Step S404, a tag description (image drawing description) representing a drawing data of an image of data forming a page is generated (image drawing description generation).

In the page data description format specification of descriptions of the present invention, one <Image> element is to represent drawing data of one image. Further, contents of the image data are described in an attribute Data, and the position of this image being drawn in the page is described with coordinate information of attributes X, Y, Width and Height. In the case in which a plurality of images is present in the page, it means that respective image data are overwritten in order of appearance. What are described in the attribute Data is an image data having been compressed by the known method, for example, in the case of an image data of color or gray scale, it is a code string having been JPEG-compressed; and in the case of a binary image data, it is a code string having been MMR-compressed.

In the description example of FIG. 6, in an tag 603, X="0", Y="0", Width="1680" and Height="2376" are described so that a scan image on the first page of the document having been selected in Step S203 of FIG. 2 is drawn all over the page. Furthermore, an <Image> element 603 of letting a character string of being converted to text of a code string of JPEG-compressed image the value of an attribute Data is described (Incidentally, in FIG. 6, to simply illustrate the drawing, a part of the character string of the Data attribute is omitted to be shown).

In Step S405, descriptions of representing a drawing data of characters of data forming the page (character drawing description) is generated (character drawing description generation).

In the page data description format specification of descriptions of the present invention, one <Text> element describes a drawing data of characters for each one of the vertical or horizontal lines. An attribute data to be described in <Text> element is as follows.

attribute Direction of indicating vertical writing/horizontal writing of a character string (Incidentally, in the case in which no Direction is specified, it is horizontal writing in default attributes X and Y specifying coordinates of the start position of characters attribute FONT of specifying ID of a font data to be applied on the occasion of drawing characters attribute Size of specifying a font size attribute Color of specifying a character color at the time of drawing with a set of four values of R component value, G component value, B component value, and alpha channel value of representing a transmittance attribute String of specifying contents of a character string (character code string)

attribute Cwidth of specifying the feed width from each character to the next character in String attribute CGlyphId of specifying a character shape data of each character in String using on the occasion of drawing, that is ID of glyph.

Here, the character string forming <Text> element is the one to be obtained by further dividing data of the character code string having been generated in Step S205 of FIG. 2 into respective character lines that are sets of characters extending vertically or horizontally. Incidentally, in the case in which an attribute Font has not been defined yet, the character shape corresponding to the font ID of default is used as a character shape common to all characters.

In the description example of FIG. 6, two <Text> tags 604 and 605 are related to character drawing descriptions of the first page, and descriptions corresponding to the character code string data 1101 and 1102 of FIG. 11A and FIG. 11B respectively.

For example, in the <Text> element description 604 corresponding to three characters of horizontally written character string "A, I, U (each Japanese character)" in the data 1101 of FIG. 11A, each attribute value is described as follows.

The attributes X and Y are specified to be X="236" and Y="272" as coordinates at the upper left of a bounding rectangle for three characters.

The attribute Font of a font data ID has not been defined.

The attribute Size of a font size is specified to be "97" pixels by estimation from the height of the characters in a line.

The attribute Direction is specified to be horizontal writing "Horizontal".

The attribute Color of a character color at the time of drawing is specified to be "0, 0, 0, 255" meaning that R component value=G component value=B component value=0, and an alpha channel=255 (that is, a transparent color is specified).

The attribute String of specifying character string contents (sequence of character codes corresponding to respective characters) is specified to be "0x2422, 0x2424, 0x2426). In the example described above, the character codes when the characters of Japanese character strings, as shown in FIG. 7, are recognized are described, however, when the characters of English character strings in the document image, as shown in FIG. 18, are recognized, the English character codes will be described as a matter of course.

The attribute CWidth of specifying the feed width of each character is specified to be "104, 96, 59", wherein with respect to two left characters, the feed width of each character corresponds to a coordinate difference between the left end of the character and the left end of the next character on the right, and with respect to the last character, the feed width of character corresponds to the character width itself.

The attribute CGlyphId of specifying ID of a glyph, being a character shape data of each character is normally specified to be ID of a glyph corresponding to the character shape data of each character. In this embodiment, however, since the character shape of transparent-colored characters is drawn on the scan image, any character shape is out of vision of a user. Thus, in this embodiment, even if they are of different characters (character kinds), by specification of the same glyph ID, a small amount of character shape data (font data) is required. Therefore, in the example of FIG. 6, the attribute FGlyphId is described to be the same attribute value of "0, 0, 0". Furthermore, the character shape to be specified with this glyph ID could be a simple shape (for example, a rectangle). Incidentally, details of the shape of glyph will be described below.

Incidentally, the above-mentioned attribute values are exemplification, and may be described to be another value having the same meaning. For example, it is preferable that the attribute Size of a font size is not described with the number of pixels but with the value of point numbers and the like from a pixel height and an image resolution. Further, the characters to be drawn in descriptions of the present invention are specified to be of a transparent color, and cannot seen by a user, so that the character string to be drawn may not be overlapped right above the corresponding character image. For example, at the lower end portion of the corresponding character image, a transparent character string may be drawn. For example, in the case of the example 604 of FIG. 6, supposing that X="236", Y="368", and Size="10", a transparent character string of low height will be drawn at the lower end portion of the character image. At this time, the size (height) of this transparent character string to be drawn is to be of a predetermined size (for example, 10) smaller than that of the character image.

The transparent character string to be drawn is used later on the occasion of searching with a search keyword, and a character string coincident with the search key word is highlighted (for example, displayed in changed color). Since the transparent character string is drawn in the position substantially corresponding to the position of the corresponding character image, although search is made using the transparent character string at the time of searching, it appears to a user as if the character image were searched. Thus, in case of using for the application of highlighting characters at the time of such searching, even if the transparent character string is drawn at the lower end portion of the corresponding character image, at the time of searching, it is highlighted and specified as if the corresponding character image were underlined, resulting in no problem. Incidentally, the drawing position of the transparent character string is not limited to the lower end, but may be described so as to be drawn in a position in lower half or upper half of the character image.

Now, in Step S406, </Page> indicating the end of page description will be described.

In Step S407, the presence or absence of pages not having been described is determined. In the case of the presence of the page not having been described, operation is repeated from Step S403; and in the case of the absence thereof, the operation goes to Step S408. In the description example of FIG. 6, processing of Steps S404 to S406 is executed with respect to the second page as well, and the portions of 607 to 610 will be described.

In Step S408, description of contents of a font data including all glyphs for use in drawing in this electronic document (character shape data description) is generated (character shape data description generation). In the page data description format specification of the present invention, every glyph included in the font data is described as <Glyph> element in the range sandwiched between <Font> and </Font>. In <Font> element, an attribute ID indicating the kind of this font is included. In addition, in <Glyph> element, included are an attribute ID indicating the kind of glyph and an attribute Path indicating a glyph (character shape) corresponding to this ID. The attribute Path in <Glyph> element, in a drawing rectangle unit of 1024×1024 of letting the lower left an origin, is description of representing a glyph using a straight line or a curve function.

In the description example of FIG. 6, in <Font> elements 611 and 612, the font of font ID="Font 01" and the font of font ID="Font 02" are defined in the <Font> elements 611 and 612 respectively. In respective contents, one kind of glyph having Id="0" is defined. "M0, 0 V-1024H1024 V1024 f" of Path attribute representing the character shape of the glyph of "Font01" of the <Font> element 611 means as follows.

"Move to an origin (0, 0), draw 1024 units of vertical line upward, draw 1024 units of horizontal line rightward, draw 1024 units of vertical line downward, and draw a line from the present point to the start point to fill the range surrounded by these lines."

That is, it is description of representing a square-shaped glyph of filling the range of 1024×1024.

Furthermore, "M0, 0 V-64H1024 V64 f" of Path attribute representing the character shape of the glyph of "Font02" of the <Font> element 612 means as follows.

"Move to an origin (0, 0), draw 64 units of vertical line upward, draw 1024 units of horizontal line rightward, draw 64 units of vertical line downward, and draw a line from the present point to the start point to fill the range surrounded by these lines."

That is, it is description of representing a horizontally-straight line glyph of filling the region of 1024×64 at the lower portion in the drawing rectangle unit.

Incidentally, descriptions of the <Font> elements 611 and 612 of FIG. 6 are just an example, and it is preferable to define another simple character shape such as vertical straight line, a wavy line, a dotted line, a triangle, a circle or a quadrangle.

Subsequently, in Step S409, </Document> indicating the end of an electronic document is described, and generation of the electronic document is ended. The electronic document having been generated is stored in the memory 103 or the hard disk 104 in the image processing device 100 as a file. On the occasion of storage, it is preferable to undergo compression using a known text compression technique.

Here, returning to FIG. 2, descriptions will be made. In Step S209, the electronic document having been generated in Step S208 is transferred to the image processing device 110, being a specified transmission destination by a transmission method having been specified in Step S201. The transfer processing preferably employs a known technique, so that descriptions will be omitted.

As described above, the electronic document having been transferred is received through the network interface 114 by the image processing device 110, and stored in the hard disk 114.

Here, it is preferable to be any ID information such as a file name for specifying an electronic document to be stored in an internal part of the hard disk. In descriptions of the present invention, a character string regarding the time of receipt is to be assigned as an example. Although there are other methods such as a unique number is selected and automatically given, or a user has preliminarily input a file name as information the user specifies at the time of generation at the image processing device 100, since these methods are processing different from essential features of the present invention, so that detailed descriptions will be omitted.

Now, an example of processing of searching and browsing an electronic document using the image processing device 110 of FIG. 1 will be described according to a flowchart of FIG. 3. Here, although an example of searching using the image processing device 110 will be described, it is not limited to this example, and it may be arranged to make search using the image processing device 100.

Figure 16:
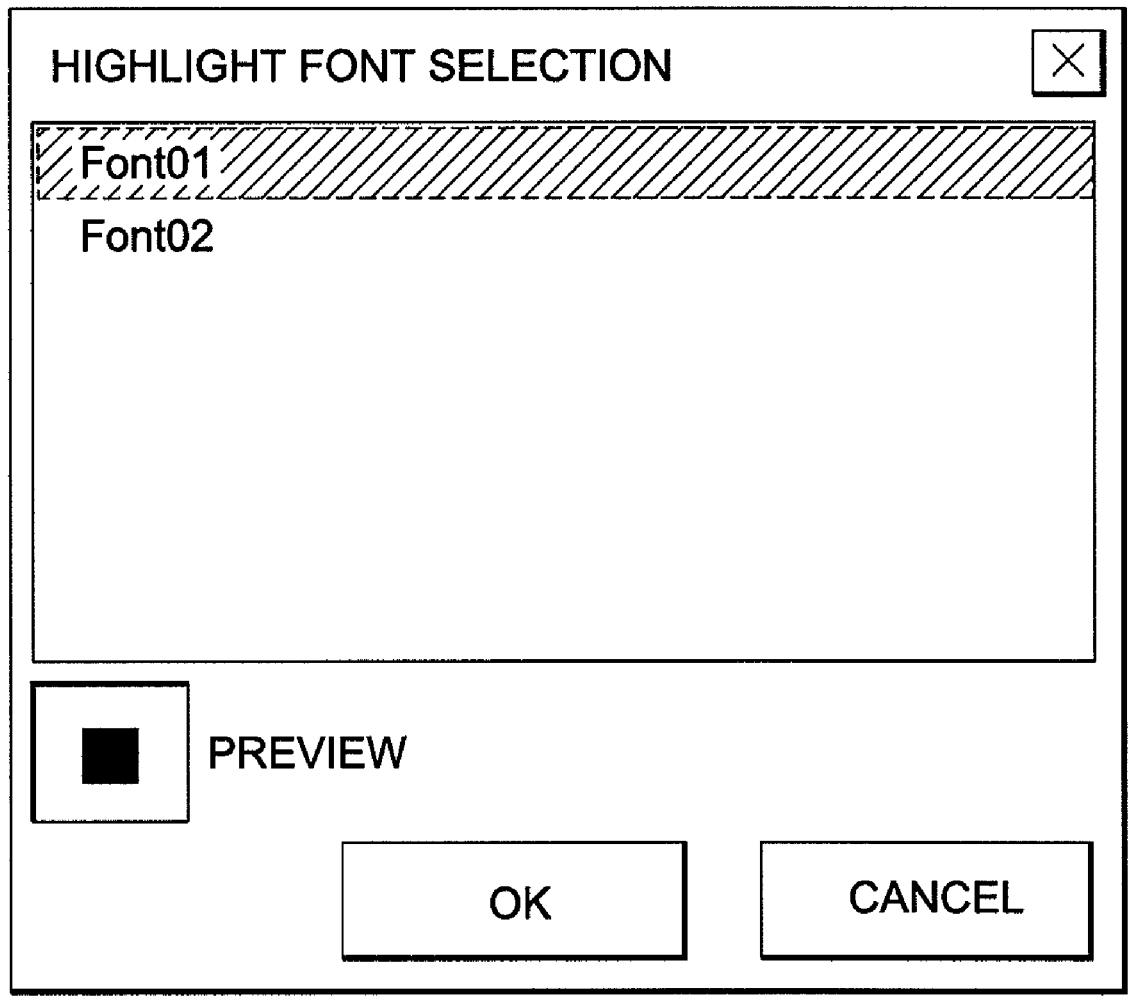
FIG. 16 is one example of UI to be displayed in the embodiment 1 of the present invention.

In Step S301, a font ID of default to be used in the case in which the Font attribute has not been defined is made to be selected by a user using UI 115 from a list of font IDs an electronic document holds. FIG. 16 illustrates one example of a selection screen UI displaying the list of fonts the electronic document to be searched possesses, and a preview image of the font of being selected (in the drawing, a black quadrilateral portion illustrates the glyph of Font01) A user can select a font ID of default using such UI. Incidentally, the sequential order of making font ID specification processing of Step S301 in FIG. 3 is exemplification, and can be in any step insofar as it is before Step S307.

In Step S302, to search a character string of a desired electronic document from electronic document group that is stored in the image processing device 110, a search keyword that is thought to be included in a text of this electronic document by a user is input from the UI 115. The length of the character string having been input here is to be k.

In Step S303, with respect to all the electronic document files stored in the hard disk 114 of the image processing device 110, it is determined whether or not there is an electronic document file not having been searched. In case where there is an electronic document file not having been searched, one electronic document file thereof is specified. Further, in the case in which this electronic document file is compressed, it is decompressed to go to Step S304. In case where there is no electronic document not having been searched, operation goes to S313, in which it is informed to the user that search with respect to all the electronic documents has ended.

In Step S304, letting a text data in the electronic document having been specified in S303 an object, preparation of searching of a search keyword character string is made. Here, texts (character codes) in the document are lined up, and a search start position n is initiated that is n=0 is set.

Here, details of the processing example in Step S304 will be described below.

In the stage of parsing an electronic document data with XML parser, when the <Text> element appears, a character code string that is described in an attribute String is obtained. Further, with respect to each character described in the String attribute therein, a set of a character code thereof and a position in which this character code value is described in the electronic document data is added to a character code and table. Here, the position in which the character code value is described is a value of indicating how many characters away by counting from the head of the electronic document data the first character describing this character code is.

Here, for the sake of clarity, an example of a character code string table that is generated from the electronic document of FIG. 6 is illustrated in FIG. 12. In this example, in the attribute String of the <Text> element 604 in FIG. 6, three character codes "0x2422", "0x2424" and "0x2426" are described. Here, they are to be described from the 1,093rd character position, the 1,100th character position, and the 1,107th character position, counting from the head of this electronic document respectively. In the same way, based on the <Text> elements 605 and 609, description positions are obtained also with respect to six numbers of the remaining character codes, and a character code string table as shown in FIG. 12 is generated. Incidentally, in FIG. 12, at this time, character string numbers (No.) are given in order from 0.

Next, in Step S305, with respect to the character code string table, letting the search start position n an origin, it is determined whether or not it is coincident with the character code string of the search key word. In the case in which the portion coincident therewith is detected, letting the variable n at this time a leading position of the coincident character string, operation goes to Step S306.

Whereas, in the case of being determined to be non-coincident in Step S305, operation goes to Step S310, in which it is determined whether or not all the characters in this character code string table have been searched. In the case in which it is determined that search of all the character code strings stored in the character code string table has ended, operation goes to Step S312, in which it is informed that search of the electronic document, being a present search object has ended. On the other hand, in the case in which it is determined that all the searches have not ended, operation goes to Step S311, in which the variable n is incremented by one, and operation returns to Step S305, in which it is determined whether or not it is coincident with the search keyword in the next search start position n. Incidentally, in Step S310, in the case of letting a total number of character codes stored in the character code string table be N, when n<(N−k), it may be determined that all the searches have not ended; and when n>=(N−k), it may be determined that all the searches have ended.

With respect to the example of the character code string table of FIG. 12, for example, in the case in which the character code strings "0x242b and 0x242d" of keyword characters "KA, KI (each Japanese character)" are scanned from the head, and the coincident portion has been detected, n=3 is extracted as a character string number of the first coincident character string. Furthermore, in the case in which in the below-described S307, search continues further, and the next coincident character string has been detected, the position n=6 is extracted. Incidentally, processing in Steps S303 to S305 using the character code and table of letting these character code and description position a pair is just an example, and other methods may be employed.

Subsequently, in Step S305, it is specified which page of an electronic document the character string data corresponding to the coincident character string number n belongs to. For example, supposing that on the occasion of parsing the electronic document data, it is determined in which <Page> element the <Text> element is described, the page number can be identified from the Number attribute. Thus, the description position of the character string corresponding to the position n having been specified in Step S306 is obtained from a character code string table of FIG. 12, and depending on between which <Page> elements this description position is resided, the page to which this character string belongs can be specified. Incidentally, on the occasion of parsing an electronic document data in Step S304, in case where it is determined in which <Page> element each <Text> element is described, and this determination results have preliminarily been stored in the character code string table of FIG. 12, a page number can easily be specified based on the character string number. Incidentally, the detection method of a coincident character string in Step S305 or the specification method of a page number in Step S306 is not limited to the above-described example.

In Step S307, based on drawing descriptions included in the page that is determined in Step S306, drawing results of the page is displayed on UI 115 (electronic document display). At this time, on the occasion of drawing a character which character string number (No.) is in the range of n to (n+k−1), in order for a user to easily identify the point corresponding to this character, this character is highlighted to be drawn. Details of drawing in which the portion coincident with this search keyword is highlighted will be described below.

Here, details of drawing processing of a page to be executed in Step S307 will be described below according to a flowchart of FIG. 5.

In Step S501, from values of Width and Height attributes in <Page> element, the size of a page image that will be drawing results is determined.

In Step S502, a memory area of such an amount as to be able to store pixel information of the page image is obtained.

In Step S503, one element not having been processed in sub-elements of <Page> element is extracted in order from the head, and the kind of this unprocessed element having been extracted is determined. In the case in which the unprocessed element is determined to be <Image>, operation goes to Step S504. On the other hand, in the case in which the unprocessed element is determined to be <Text>, the operation goes to Step S505. In the case in which all the sub-elements in this <Page> element have been processed, the operation goes to Step S517.

In Step S504, a compressed image that is described as Data attribute values of <Image> element is decompressed. In addition, this image having been decompressed is subjected to scaling so as to stay all over a drawing rectangle region in the page image X, Y, Width and Height attributes represent. Further, this image is overwritten on this area of the page image memory having been obtained in the above-mentioned Step S502. Thereafter, the operation returns to Step S503.

On the other hand, in Step S505, from each attribute described in the <Text> element to be processed, a character start position (X, Y), a font ID (F), a character size (S), and a character color (C) are obtained. Furthermore, the number (N) of characters that are described in this <Text> element is obtained. Incidentally, in the case in which the font ID is not defined as shown in the example of FIG. 6, a font ID of default having been specified in the above-described S301 is used.

In Step S506, a memory area for glyph image generation is obtained. Here, the memory for a binary image of 1024×1024 pixels is to be obtained.

In Step S507, a counter i of a character being processed is initiated to be 1.

In Step S508, it is determined whether or not i>N. When i≦N, operation goes to Step S509; and when i>N, processing of this <text> element is ended to return to Step S503.

In Step S509, a character code (P) of the i_th character is obtained from the attribute String of the <text> element, and a GlyphId (Q) of the i_th character is obtained from the attribute CGlyphId.

In Step S510, <Font> element description of font Id=F is detected from an electronic document, and further a Path attribute is obtained from <Glyph> element of glyph Id=Q in the sub-element of this <Font> element description.

In Step S511, according to the Path attribute values having been obtained in Step S510, a binary image of the glyph is generated with respect to the glyph image generation memory having been obtained in Step S510. Incidentally, the binary image of glyph is, for example, the image represented by letting the portion at which drawing is done 1, and letting the portion at which no drawing is done 0. Incidentally, in this embodiment, the portion 1 at which drawing is done is to be drawn with a transparent color later.

In Step S512, the binary image of glyph is scaled so as to be of such a rectangular size as to be based on an attribute value (S) of the character size.

In Step S513, in the rectangular region starting from the position (X, Y) of the page image memory, information of the scaled binary image of glyph is drawn. A pixel value of each pixel when the binary image is drawn over the page image will be defined with the following expressions. At this time, pixel values (r, g, b) in the object region of the page image are changed to the following (r', g', b') respectively depending on whether the value of the corresponding pixel in the binary image is 0 or 1.

in the case of a pixel which pixel value of a glyph binary image is 0:

(r', g', b')=(r, g, b)

in the case of a pixel which pixel value of a glyph binary image is 1:

(r', g', b')=(F (r, Cr), F (g, Cg), F (b, Cb))

Where: F (r, Cr)=(r×A+Cr×(255−A))/255, F (g, Cg)=(g×A+Cg×(255−A))/255, F (b, Cb)=(b×A+Cb×(255−A))/255. Furthermore, A is an alpha channel value of a character color C, and Cr, Cg, and Cb are respective RGB values of the character color C. Incidentally, in the case in which 255 is specified as the alpha channel value, since this glyph binary image is transparent, also with respect to the pixel which pixel value of a glyph binary image is 1, (r', g', b')=(r, g, b).

In step S514, it is determined whether or not the i_th character being processed is the character which character string number (No.) is in the range of n to (n+k−1), using, for example, the character code string table of FIG. 12. In specific, since the description start position of a character in the range of n to (n+k−1) is determined from the character code string table, determination is made based on whether or not the start position of the character i being processed is coincident with any one. In the case of being the character in the range of n to (n+k−), operation goes to Step S515; and in the other cases, the operation goes to Step S516.

In Step S515, highlighting is done for indicating that the character being processed is in the range of being detected as a search character string. Specifically, the pixel which pixel value of the corresponding glyph binary image is 0 remains as it is, and with respect to the pixel which pixel value of the corresponding glyph binary image is 1, pixel values (r, g, b) are changed to the following (r', g', b') respectively.

(r', g', b')=(G(r), G(g), G(b))

Where: G(r)=255-r, G(g)=255-g, and G(b)=255-b.

Incidentally, the above-mentioned highlighting processing is exemplification. For example, the width of being highlighted is not the width of a glyph binary image, but using the values of an attribute of Cwidth specifying the feed width of each character, a string of characters may be solid filled without an interval.

On the other hand, in Step S516, the feed width of this character described as the i_th character of the CWidth attribute is added to X, as well as 1 is added to i (i=i+1), and processing from Step S503 is repeated. In the stage of Step S503, when there is no unprocessed sub-element, operation proceeds to Step S517.

In Step S517, contents of the page image memory, being drawing results of one page that is drawing results of <Image> and <Text> element descriptions in the <Page> element are transferred to a display buffer of the UI 115 to be displayed.

Figure 5:
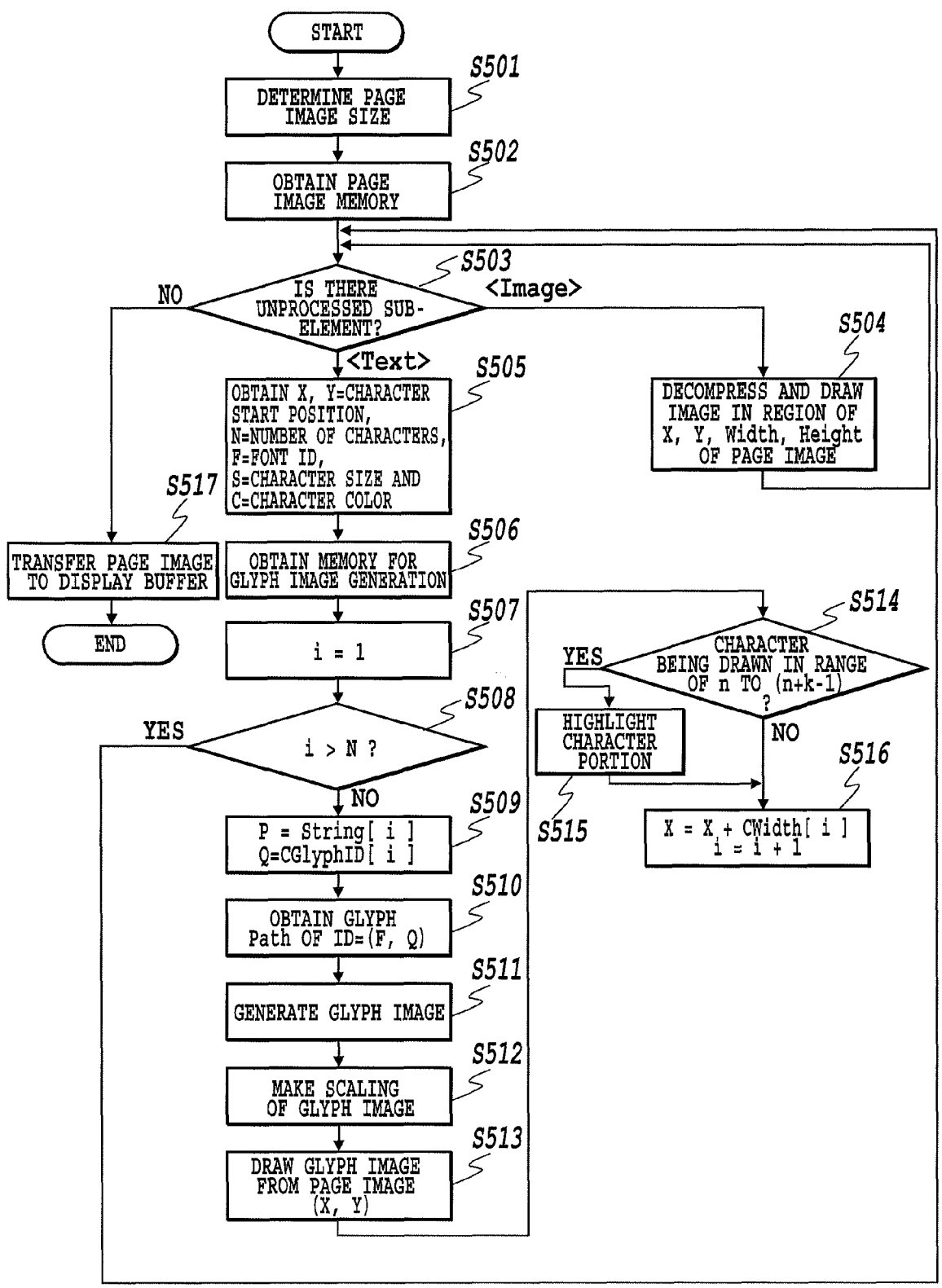
FIG. 5 is a flowchart showing an example of drawing processing of a page to be executed in Step S307 in FIG. 3.

Next, an example in the case of executing processing of Step S307 of FIG. 3 the flowchart of FIG. 5 shows based on drawing descriptions on the first page in the electronic document of FIG. 6 will be described.

By processing in Step S501, from the attribute values of Width="1680", Height="2376" of the <Page> element of the first page in FIG. 6, the image size of the page is determined to be 1680×2376 pixels.

By processing in Step S502, for example, in the case in which the page image is explained with RGB 24 bit colors, the memory of 1680×2376×3 bites is obtained.

By processing in Step S504, a compression code that is described in the Data attribute value of the <Image> element 603 of FIG. 6 is decompressed to be an image data, which is overwritten all over the page image memory. Incidentally, in this example, the image data originally has the same size of 1680×2376 pixels as that of the page, so that no scaling processing is applied.

By processing in Step S505, from the <Text> element 604 in FIG. 6, X="236", Y="272", a character number N=3, a character size="97", and a character color="0, 0, 0, 255" are obtained. In the <Text> element 604, a Font element is not defined, so that a character code of default having been specified in S301 is specified. Here, a font ID="Font01" is to be specified in S301.

By processing in Step S509, first, the first character code=0x2422 and CGlyphId="0" in the String attribute of the <Text> element 604 are obtained.

The binary image of glyph to be generated in Step S511, since the font ID="Font01" of default is specified, is created based on the Path attribute described in the <Glyph> element of Id="0" that is in the <Font> element 611 of FIG. 6. In specific, based on description of the Path attribute, all the Glyph image region of 1024×1024 pixels is filled with 1.

Incidentally, since all the CGlyphIds of the characters in the <Text> elements 604 and 605 that are described in the electronic document of FIG. 6 are "0", as a result, processing results of Step S511 will be the same with respect to all the characters. Thus, the glyph image having been generated in Step S511 is temporarily stored in the memory, and on the occasion of drawing other characters, this glyph image being temporarily stored may also be used.

In Step S512, the character image of glyph is scaled to 97×97 pixels with the character size="97".

In Step S513, the rectangular range of 97×97 pixels starting from the position (236, 272) of the page image is to be a drawing object region of the character image of glyph having been scaled. In the example of FIG. 6, however, since the character color="0, 0, 0, 255" that is the alpha value A=255, even if the corresponding pixel value of the binary image of glyph is 1, (r', g', b')=(r, g, b) at all times. That is, the pixel value in this rectangular region in the page image is not changed before and after the processing of Step S513.

Figure 3:
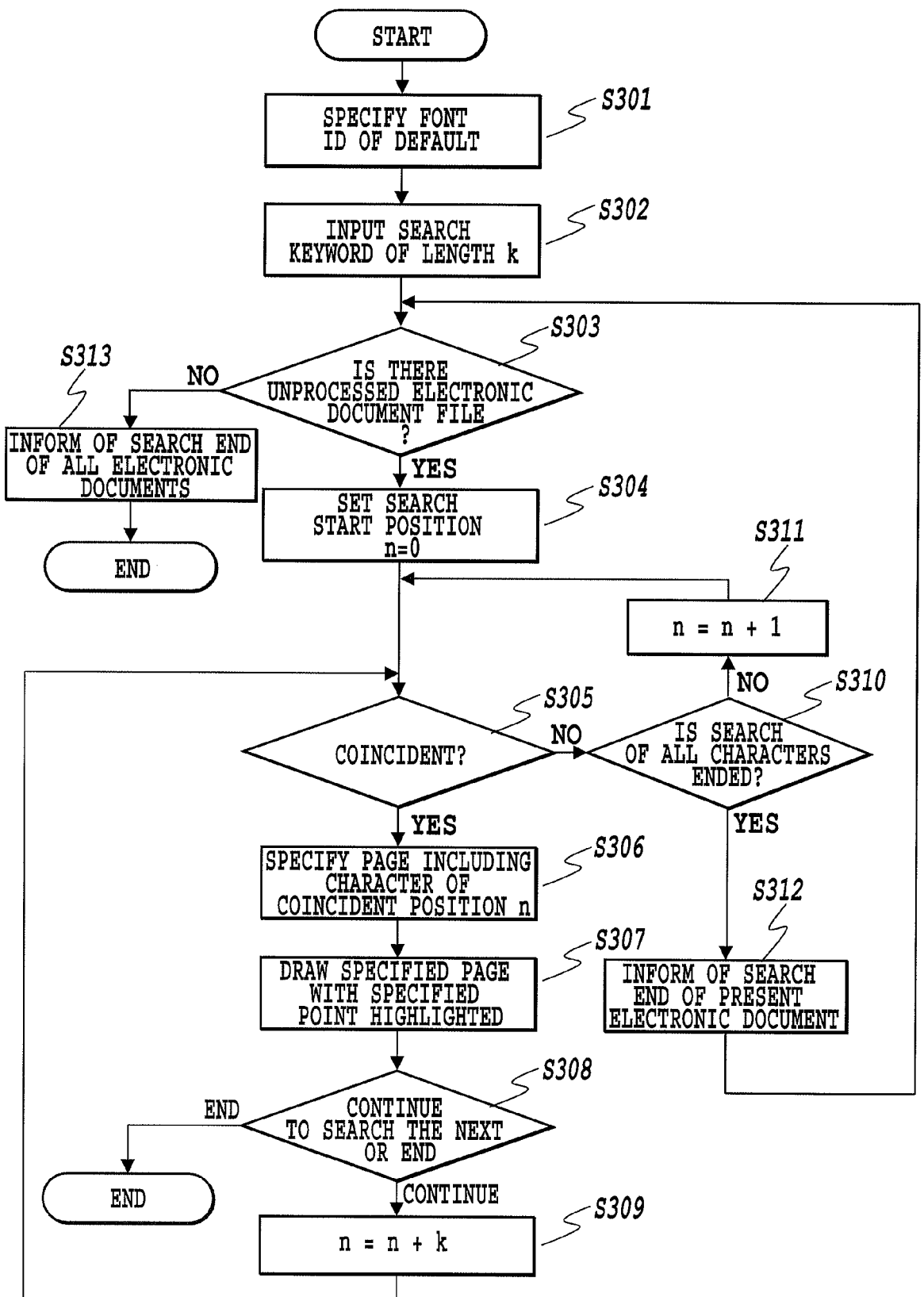
FIG. 3 is a flowchart showing an example of electronic document searching and browsing processing according to the embodiments 1 and 2 of the present invention.

In Step S514, it is determined based on the character code string table whether or not the first character in the <Text> element 604 in FIG. 6 is a character in the range of positions n to (n+k−1) having been obtained in Step S305 of FIG. 3.

Here, for example, the character code string table of FIG. 12 is generated from the electronic document of FIG. 6, and it is supposed that the position of the character string having been determined to be coincident with the keyword in Step S305 of FIG. 3 is in the range of 3 to 4. At this time, the leading character position of the first character code description in the <Text> element 604 in FIG. 6 is 1093rd as illustrated. This number is not coincident with any description position of the characters in the range of 3 to 4 of the character code string table, so that processing proceeds to the next character through Step S516.

Thereafter, processing goes on, and in processing of the first character in the <Text> element 605 in FIG. 6, in Step S514, the position thereof is determined to be coincident with the starting position of the characters in the range of 3 to 4 of the character code string table. In Step S515, highlighting processing is executed.

With respect to this character, in Step S515, pixel values (r, g, b) of the pixel which pixel value of the corresponding glyph binary image in the region of 92×92 starting from the position (236, 472) of the page image memory is 1 are changed to (G (r), G (g), G (b)) respectively.

Figure 13:
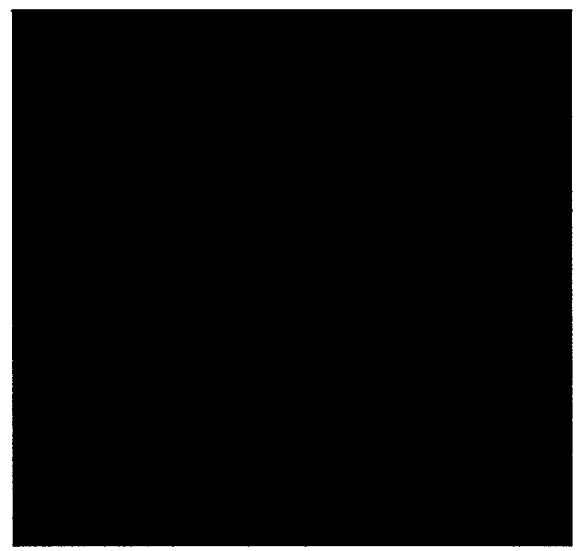
FIG. 13 is an example of page display in which a search point is highlighted to be carried out in the embodiments 1 and 2 of the present invention.

The page image after all the <Text> elements have been drawn as described above, will be as illustrated in FIG. 13. That is, the region corresponding to the character in the range having been determined to be coincident in Step S305 comes to be in the state in which the luminance is inverted in each rectangle. Whereas, the region corresponding to the remaining characters left is as the image data with the <Image> element drawn. In the example described above, the case of a Japanese document is described, and however the case of an English document is processed similarly. For example, when the electronic document data generation processing, shown in FIG. 4, is executed with respect to such an image shown in FIG. 18, electronic document data is generated, in which the electronic documents 604 and 605 in FIG. 6 are described in alphabet character codes. When the electronic document data is searched with, for example, a character string "EF", the drawing processing shown in FIG. 5 is executed and the image in the rectangular region corresponding to the searched character string is reverse-displayed as shown in FIG. 19.

Therefore, since the character string having been searched is highlighted, a user can easily determine where the search keyword is resided in the page only by looking at the image on the page that is displayed in Step S307.

Figure 17:
FIG. 17 is an example of a page display in which a character image becomes invisible when a searched part is highlighted.

On the other hand, depending on the kind of viewer application, there are some cases of different display methods on the occasion of highlighting. That is, depending on the method of highlighting processing of a character portion of Step S515 in FIG. 5, in some cases, a suitable highlighting cannot be made such as a user cannot identify described characters. For example, in highlighting processing, it is assumed that there is a viewer of causing the pixel which pixel value of the corresponding glyph binary image is 0 to be as it is, and causing pixel values (r, g, b) to change to colors having preliminarily been determined (for example, (0, 0, 0)) respectively with respect to the pixel which pixel value of the glyph binary image is 1. In this case, since Font01 according to this embodiment uses the glyph of solid filled quadrangle, when highlighting, the page image as is in FIG. 17 will be displayed. When it is in the state as is FIG. 17, the character image cannot be seen, and visibility of a user becomes worse.

Thus, in this embodiment as described above, the case of being used with such viewer application is supposed, on the occasion of generating an electronic document in Step S208, plural kinds of font data having different glyphs are to be stored. Therefore, in case where a user specifies another font ID by using again the processing of font ID specification in Step S301 of FIG. 3, the method of highlighting can be changed.

Figure 14:
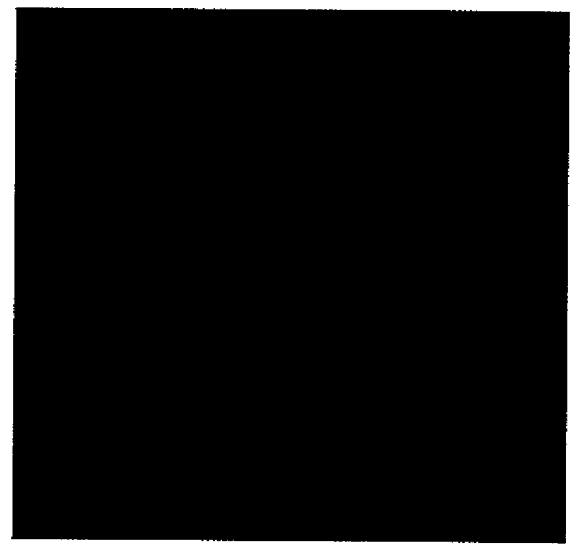
FIG. 14 is an example of page display in which a search point is highlighted to be carried out in the embodiment 1 of the present invention.
Figure 20:
FIG. 20 is an example of a page display in which a search result is highlighted.

An example of page image display in the case in which "Font02" is specified as the font ID of default in S301, and highlighting is performed is illustrated in FIG. 14. When highlights of pixel values (r, g, b) being changed to (0, 0, 0) respectively, are drawn with the use of the glyph binary image to be specified in the description 612 in FIG. 6, the page image as is FIG. 14 is generated. That is, since the glyph for use in "Font02" is a horizontally-straight line glyph of filling the region of 1024×64 at the lower portion in the drawing rectangle unit, in the case in which the pixel values at this portion are to be (0, 0, 0), highlighting will be done as if characters were underlined characters as is in FIG. 14. Thus, a user can easily determine where in the page the character string having been searched is resided, as well as visibility of the character image can be assured. Note that, although FIG. 14 shows an example of a document image including Japanese character strings, it is also possible to process a document image including English (alphabet) character strings similarly. For example, when the document image is searched with a character string "EF", the searched character string is highlighted as if an underline is provided to the character string as shown in FIG. 20.

Here, descriptions return to FIG. 3. In Step S308, it is selected by a user whether searching and browsing processing is ended, or searching continues further with another search point an object. In the case in which searching is selected to end by a user, the processing of FIG. 3 is ended; and in the case in which searching is selected to continue, the operation goes to Step S309.

In Step S309, n=n+k, and operation returns to Step S305, to repeat processing thereafter.

As described above, according to the embodiment 1 of the present invention, on the occasion when a paper document is converted to an electronic document, descriptions are made so that characters having been extracted from pages are drawn with a transparent color on the page image, as well as a plurality of fonts having different character shapes are stored. With respect to this electronic document, a user can select the character shape of default for use in highlighting, that is, he/she can make switching instruction of the character shape. Thus, switching to a character shape best-suited to each viewer application, or the document image thereof can be made, and this character can be highlighted. It is possible to continue to search while a user confirming the page display in which the point coincident with a search keyword is highlighted in the form of high visibility.

In the electronic document according to this embodiment, there are in an internal part thereof a plurality of font data that are formed of simple character shapes with respect to one character, and on the occasion of drawing transparent characters in the document, one of the above-mentioned simple character shapes can be selected to be drawn. Furthermore, in each font data, one character shape is to be utilized in common with respect to a plurality of character kinds. Therefore, although font data to be used are held in the electronic document, there are only small amounts of character shape data, so that the file size (data capacity) of this electronic document can be minimized. Furthermore, plural font data are stored, so that display of high visibility or operability at the time of highlighting of search can be made.

Embodiment 2

Now, a second exemplary embodiment (embodiment 2) according to the present invention will be described referring to the drawings.

FIG. 15 is an example of an electronic document generated according to this embodiment 2. As is the above-described embodiment 1, the image processing device 100 generates and transmits an electronic document, and the image processing device 110 receives, browses, and searches it.

Reference numerals 1501 and 1502 in FIG. 15 designate descriptions of representing the start and end of an electronic document. Numerals 1502 and 1506 designate descriptions of representing the start and end of drawing on the first page. Numeral 1503 designates descriptions of image data drawing on the first page. Numerals 1504 and 1505 designate descriptions of character drawing on the first page. Furthermore, numerals 1507 and 1510 designate descriptions of representing the start and end of drawing on the second page. Numeral 1508 designates descriptions of image data drawing on the second page. Numeral 1509 designates descriptions of character drawing on the second page. Numeral 1511 and 1512 designate descriptions of a font data for use in this electronic document.

Although in the embodiment 1, a font ID of default is selected by a user in Step S301 of FIG. 3, in the embodiment 2, an electronic document is generated so that an application (viewer) of making a browsing operation can make a determination for selection thereof. In this case, in font data description in Step S408 of FIG. 4, an attribute for determination of the application is added to <Font> element. In this embodiment, from an attribute of Shape in <Font> elements 1511 and 1512 in FIG. 15, the shape of a font data (feature of a font data) can be easily determined. In this case, by using this Shape attribute of the font data as a determination reference, the application can select a display font ID suitable for highlighting by means of this application. Incidentally, the above-mentioned additional attribute is just an example, and other than the feature of a font data, the name or the kind of an application of making a browsing processing may be described as an attribute. In this case, letting this attribute be a determination reference, for example, the application makes a determination of a font data in which its application name is included, and the font ID for default display is determined.

According to the embodiment 2, on the occasion when a paper document is converted to an electronic document, characters having been extracted from the page are described so as to be drawn with a transparent color on a page image, a plurality of fonts having different character shapes are described, and there is included the attribute for determination on which font the application has to use. With respect to this electronic document, the application (viewer and the like) can determine the above-mentioned attribute and automatically select the character shape, and can switch to the character shape suitable for highlighting with the use of this application to be displayed. In addition, while a user confirming a page display in which the point coincident with a search keyword is highlighted, as well as in which visibility of the character image is automatically assured, he/she can continue to search.

As described above, an electronic document according to the embodiment 2, in drawing all transparent characters having been described in the document, is described so that an application (viewer and the like) determines the attribute, and selects one character shape from a plurality of character shapes and draws it. Furthermore, in each font data, one character shape is to be utilized in common with respect to a plurality of character kinds. Therefore, although the electronic document holds a font data for use in this electronic document, it is smaller amounts of character shape data, so that the file size (data capacity) of the electronic document can be minimized. In addition, since some font data are stored, display best-suited to the application can be done at the time of highlighting of search.

Embodiment 3

Furthermore, although in the above-described embodiment, generated is an electronic document in which an entire image of e.g., JPEG compression being made with respect to a scan image is described in <Image> element, and a transparent text is described in <Text> element, it is not limited to this example.

For example, instead of descriptions of the one to be obtained by JPEG compression of the entire scan image in <Image> element, in a character region or a graphic region, the one to be obtained by creating a binary image with respect to individual colors to be MMR compressed may be stored, and in the other regions, the one of being JPEG compressed may be stored. In such way, the method of analyzing the region included in a document image to make a compression processing as appropriate can employ the method of being described in, for example, Japanese Patent Laid-Open No. 07-236062 (1995) or Japanese Patent Laid-Open No. 2002-077633. In combination of processing of suppressing the data amount of a font data for use in drawing a transparent text according to the present invention and this image compression processing, a more highly compressed electronic document can be generated.

In addition, instead of an entire image, it is preferable to store only part regions such as a character region, a graphic region, a table region, and a photograph region along with a position data.

Embodiment 4

In addition, in the above-described embodiments, as described in FIGS. 3 and 5, on the occasion of searching, a character string coincident with a keyword is searched in order from the head of a document, and the character string having been detected first is highlighted. Further, it is arranged such that in case of the presence of instruction of "search next", sequentially, the next coincident character string is searched to be highlighted. Like this, although in the above-described embodiments, the character string coincident with the search keyword is searched in order from the head, and highlighting is made in sequence each time the search keyword is hit, it is not limited to this case. For example, it is preferably arranged such that all character strings that are included in an electronic document are compared with the search keyword, all the character strings coincident therewith are specified, and all the character strings coincident with this keyword are highlighted at the same time.

Heretofore, various exemplary embodiments according to the present invention have been described.

An object of the present invention is also achieved by a program code that performs operations of the flowcharts described in the above-mentioned embodiments being read and executed by a computer (or CPU or MPU) of a system or a device from a recording medium in which this program code is recorded. In this case, the program code itself having been read out from the recording medium causes the computer to implement the functions of the above-described embodiments. Therefore, these program code and computer-readable recording medium in which the program code is stored and recorded also form one of the present invention.

As the recording medium for providing the program code, employed can be, for example, a floppy (trade mark) disk, a hard disk, an optical disk, a magneto-optical disk, CD-ROM, CD-R, a magnetic tape, a non-volatile memory card, and ROM.

Furthermore, the functions of the above-described embodiments are implemented by the program having been read out being executed by the computer. Further, implementation of this program also includes the case in which e.g., OS that operates on the computer executes a part or all of an actual processing based on instructions of the program.

Moreover, the function of the above-described embodiments can be implemented also by an expanded board that is inserted in the computer or an expanded unit that is connected to the computer. In this case, first, the program code having been read out from the recording medium is written in a memory that is provided at an expanded board that is inserted in the computer or an expanded unit that is connected to the computer. Thereafter, based on instructions of this program code, the CPU and the like that is provided at such expanded board or expanded unit executes a part or all of an actual processing. Also by processing by means of such expanded board or expanded unit, the functions of the above-described embodiments are implemented.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-321283, filed Dec. 12, 2007, which is hereby incorporated by reference herein in its entirety.

What is claimed is:

1. An image processing device comprising:
   a character recognition unit configured to obtain a plurality of character codes corresponding to a plurality of character images by
   executing a character recognition processing for the plurality of character images in a document image; and
      a generation unit configured to generate an electronic document in which the document image, the plurality of character codes obtained by the character recognition unit, and a plurality of kinds of glyph data are stored, each kind of the glyph data including one kind of character shape data,
      wherein one glyph data is selected from the plurality of kinds of glyph data stored in the electronic document, the plurality of kinds of glyph data include a glyph data drawn at a lower end portion of the corresponding character image so that it is specified as if the corresponding character image were underlined at the time of searching, and the one kind of character shape data corresponding to the selected glyph data is utilized in common with respect to all of the plurality of different character codes stored in the electronic document when drawing characters corresponding to the plurality of character codes stored in the electronic document for a keyword search.

2. The image processing device according to claim 1, wherein in a case of drawing the document image and the character codes that are stored in the electronic document, the one glyph data for use in drawing the characters is selected from plural kinds of the glyph data by an instruction of a user or an application for use in drawing.

3. The image processing device according to claim 1, wherein the glyph data is the glyph data of a simple shape.

4. The image processing device according to claim 1, wherein the plurality of kinds of glyph data stored in the electronic document include the glyph data having a rectangular shape.

5. The image processing device according to claim 1, wherein the plurality of kinds of glyph data stored in the electronic document include the glyph data having at least any shape of a wavy line, a dotted line, a triangle, a circle or a quadrangle.

6. The image processing device according to claim 1, wherein the generation unit is configured to store in the electronic document an attribute data that will be a criteria to be used on the occasion when an application for use in drawing the electronic document selects a glyph data for use in drawing from plural kinds of the glyph data that are stored.

7. The image processing device according to claim 1, wherein the electronic document generated by the generation unit includes a description for drawing with a transparent color the glyph data corresponding to a plurality of the character codes in a position substantially corresponding to each character image in the document image.

8. The image processing device according to claim 1, wherein the electronic document is described in XML format or XPS format.

9. The image processing device according to claim 1, further comprising
   a compression unit configured to compress the document image,
   wherein the document image stored in the electronic document is subjected to compression processing by the compression unit.

10. The image processing device according to claim 9, wherein the compression unit analyzes a region that is included in the document image, and makes a compression adaptively.

11. The image processing device according to claim 1, further comprising
   a search unit configured to search with an input keyword with respect to the generated electronic document, and highlight a portion coincident with the keyword using any one of the plurality of kinds of glyph data.

12. The image processing device according to claim 2, further comprising
   a search unit configured to search with an input keyword with respect to the generated electronic document, and highlight a portion coincident with the keyword using glyph data selected from among the plurality of kinds of glyph data by the user's instruction or an application used in drawing.

13. An image processing method comprising:
   obtaining a plurality of character codes corresponding to a plurality of character images by executing a character recognition processing for the plurality of character images in a document image; and
   generating an electronic document which stores the document image, the plurality of character codes obtained by the character recognition processing, and a plurality of kinds of glyph data, each kind of the glyph data including one kind of character shape data,
   wherein one glyph data is selected from the plurality of kinds of glyph data stored in the electronic document, the plurality of kinds of glyph data include a glyph data drawn at a lower end portion of the corresponding character image so that it is specified as if the corresponding character image were underlined at the time of searching, and the one kind of character shape data corresponding to the selected glyph data is utilized in common with respect to all of the plurality of different character codes stored in the electronic document when drawing characters corresponding to the plurality of character codes stored in the electronic document for a keyword search.

14. A non-transitory computer-readable recording medium having computer-executable instructions for performing an image processing method, the image processing method comprising the steps of:
   obtaining a plurality of character codes corresponding to a plurality of character images by executing a character recognition processing for the plurality of character images in a document image; and
   generating an electronic document which stores the document image, the plurality of character codes obtained by the character recognition processing, and a plurality of kinds of glyph data, each kind of the glyph data including one kind of character shape data,
   wherein one glyph data is selected from the plurality of kinds of glyph data stored in the electronic document, the plurality of kinds of glyph data include a glyph data drawn at a lower end portion of the corresponding character image so that it is specified as if the corresponding character image were underlined at the time of searching, and the one kind of character shape data corresponding to the selected glyph data is utilized in common with respect to all of the plurality of different character codes stored in the electronic document when drawing characters corresponding to the plurality of character codes stored in the electronic document for a keyword search.

* * * * *